(12) United States Patent
Li et al.

(10) Patent No.: US 11,636,664 B2
(45) Date of Patent: Apr. 25, 2023

(54) TRAINING METHOD AND DEVICE OF NEURAL NETWORK FOR MEDICAL IMAGE PROCESSING, AND MEDICAL IMAGE PROCESSING METHOD AND DEVICE

(71) Applicant: BOE TECHNOLOGY GROUP CO., LTD., Beijing (CN)

(72) Inventors: Yingying Li, Beijing (CN); Lvwei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 133 days.

(21) Appl. No.: 16/053,574

(22) Filed: Aug. 2, 2018

(65) Prior Publication Data
US 2019/0065884 A1    Feb. 28, 2019

(30) Foreign Application Priority Data

Aug. 22, 2017   (CN) .......................... 201710724796.9

(51) Int. Cl.
*G06V 10/32*   (2022.01)
*G06K 9/62*    (2022.01)
(Continued)

(52) U.S. Cl.
CPC ............. *G06V 10/32* (2022.01); *G06K 9/627* (2013.01); *G06K 9/6256* (2013.01);
(Continued)

(58) Field of Classification Search
CPC .... G06K 2209/05; G06K 9/3233; G06K 9/42; G06K 9/6256; G06K 9/6267;
(Continued)

(56) References Cited

U.S. PATENT DOCUMENTS 9,767,557 B1 *   9/2017   Gulsun ...................... G06T 7/60
2005/0054936 A1 *  3/2005   Balas ................. A61B 1/00186
                                                        600/476
(Continued)

FOREIGN PATENT DOCUMENTS

CN    105512680 A    4/2016
CN    106408564 A    2/2017
(Continued)

OTHER PUBLICATIONS

Chinese Office Action dated Dec. 4, 2019, from application No. 201710724796.9.
(Continued)

*Primary Examiner* — Margaret G Mastrodonato
*Assistant Examiner* — Nicole M Louis-Fils
(74) *Attorney, Agent, or Firm* — Perilla Knox & Hildebrandt LLP; Kenneth A. Knox

(57) ABSTRACT

The present disclosure provides a training method and device of a neural network for medical image processing, a medical image processing method and device, and an electronic apparatus for medical image processing based on a neural network. The training method includes performing a pre-processing process on an original image to obtain a pre-processed image, performing a data-augmenting process on the pre-processed image to obtain an augmented image retaining a pathological feature, the augmented image including at least one image with first resolution and at least one image with second resolution being higher than the first
(Continued)

resolution, and training the neural network by selecting the image with first resolution and a part-cropping image from the image with second resolution as training samples.

10 Claims, 4 Drawing Sheets

(51) Int. Cl.
  *G06T 7/00* (2017.01)
  *G06V 10/25* (2022.01)
(52) U.S. Cl.
  CPC .......... *G06K 9/6267* (2013.01); *G06T 7/0012* (2013.01); *G06V 10/25* (2022.01); *G06T 2207/10024* (2013.01); *G06T 2207/10056* (2013.01); *G06T 2207/10081* (2013.01); *G06T 2207/10088* (2013.01); *G06T 2207/10104* (2013.01); *G06T 2207/10116* (2013.01); *G06T 2207/10132* (2013.01); *G06T 2207/20016* (2013.01); *G06T 2207/20076* (2013.01); *G06T 2207/20081* (2013.01); *G06T 2207/20132* (2013.01); *G06T 2207/30088* (2013.01); *G06T 2207/30096* (2013.01); *G06V 2201/03* (2022.01)
(58) Field of Classification Search
  CPC .......... G06K 9/627; G06T 2207/10024; G06T 2207/10056; G06T 2207/10081; G06T 2207/10088; G06T 2207/10104; G06T 2207/10116; G06T 2207/10132; G06T 2207/20016; G06T 2207/20076; G06T 2207/20081; G06T 2207/20132; G06T 2207/30088; G06T 2207/30096; G06T 7/0012
  USPC ........................................................ 382/128
  See application file for complete search history.

(56) References Cited

U.S. PATENT DOCUMENTS

| | | | |
|---|---|---|---|
| 2009/0035218 A1* | 2/2009 | Ross | G01R 33/56341 424/9.1 |
| 2012/0134595 A1* | 5/2012 | Fonseca | G06T 3/40 382/195 |
| 2017/0200067 A1* | 7/2017 | Zhou | G06V 10/443 |
| 2017/0206632 A1* | 7/2017 | Milanfar | G06T 3/4053 |
| 2017/0236271 A1* | 8/2017 | Kim | G06K 9/6256 382/128 |
| 2018/0012411 A1* | 1/2018 | Richey | G06T 19/006 |
| 2018/0144465 A1* | 5/2018 | Hsieh | G06N 3/08 |
| 2018/0286037 A1* | 10/2018 | Zaharchuk | G06T 5/50 |
| 2018/0374209 A1* | 12/2018 | Patil | G06T 7/11 |
| 2019/0095795 A1* | 3/2019 | Ren | G06N 3/082 |
| 2019/0164290 A1* | 5/2019 | Wang | G06K 9/4628 |
| 2019/0311209 A1* | 10/2019 | Ducote | G06K 9/3233 |
| 2020/0097727 A1* | 3/2020 | Stumpe | G02B 21/365 |

FOREIGN PATENT DOCUMENTS

| | | |
|---|---|---|
| CN | 106780482 A | 5/2017 |
| CN | 107516080 A | 12/2017 |
| JP | 3941119 B2 | 7/2007 |

OTHER PUBLICATIONS

Wang, Xiao-feng, "Intelligent Data Mining Algorithms Research and Their Application in the Medical Image Area", Master's Degree Dissertation, Department of Computer Science, Northwest University.
Wu, Ying Nian, "Data Augmentation", Computer Vision, 2014 Edition, Feb. 5, 2016, Department of Statistics, UCLA.
2nd Office Action dated Sep. 11, 2020 for Chinese Patent Application No. 201710724796.9.
Karpathy, Andrej, et al. "Large-scale video classification with convolutional neural networks." Proceedings of the IEEE conference on Computer Vision and Pattern Recognition. 2014.

* cited by examiner

TRAINING METHOD AND DEVICE OF NEURAL NETWORK FOR MEDICAL IMAGE PROCESSING, AND MEDICAL IMAGE PROCESSING METHOD AND DEVICE

CROSS-REFERENCE

The present application is based upon and claims priority to Chinese patent application No. 201710724796.9, filed on Aug. 22, 2017, and the entire contents thereof are incorporated herein by reference.

TECHNICAL FIELD

The present disclosure relates to the field of image processing technology, and more particularly, to a training method and device of a neural network for medical image processing, a medical image processing method and device, and an electronic apparatus for medical image processing based on a neural network.

BACKGROUND

Early detection and accurate diagnosis of skin diseases are critical, especially for melanoma. The dermoscopy, also known as skin surface microscope, is a non-invasive microscopic image analysis technique for observing microstructures and pigments under the skin surface of living body. The dermoscopy is essentially a skin microscope with dozens of times magnification, and has a function like that of the ophthalmoscope in ophthalmology and the otoscope in otolaryngology, which is a very useful device for observing skin pigmentary diseases.

It should be noted that the information disclosed in the foregoing background section is only for enhancement of understanding of the background of the present disclosure and therefore may include information that does not constitute prior art that is already known to those of ordinary skill in the art.

SUMMARY

Arrangements of the present disclosure relate to a training method and device of a neural network for medical image processing, a medical image processing method and device, and an electronic apparatus for medical image processing based on a neural network.

According to some arrangements of the present disclosure, there is provided a training method of a neural network for medical image processing, including performing a pre-processing process on an original image to obtain a pre-processed image, performing a data-augmenting process on the pre-processed image to obtain an augmented image which retains a pathological feature, the augmented image including at least one image with first resolution and at least one image with second resolution, and the second resolution being higher than the first resolution, and training the neural network by selecting the image with first resolution and a part-cropping image from the image with second resolution as training samples.

In an arrangement of the present disclosure, the performing a pre-processing process on an original image includes performing a pixel normalizing process and a color constancy process on the original image.

In an arrangement of the present disclosure, the performing a data-augmenting process on the pre-processed image includes at least one of the following processes to augment the pre-processed image: cropping process, rotating process, upside-down inverting process and horizontal inverting process.

In an arrangement of the present disclosure, the performing a data-augmenting process on the pre-processed image further includes performing an image-warping process on the pre-processed image.

In an arrangement of the present disclosure, the original image includes a dermoscopy image, the cropping process is performed on the pre-processed image to retain a boundary of a lesion area, and the image-warping process is performed on the pre-processed image to retain a symmetrical characteristic of the lesion area.

In an arrangement of the present disclosure, the part-cropping image from the image with second resolution includes a center-cropping image, and the center-cropping image has a same resolution as that of the image with first resolution.

In an arrangement of the present disclosure, the augmented image includes at least one image with third resolution which is higher than the first resolution, and the image with first resolution, the part-cropping image from the image with second resolution and a part-cropping image from the image with third resolution are selected as the training samples to train the neural network.

In an arrangement of the present disclosure, resolutions of the part-cropping image from the image with second resolution, the part-cropping image from the image with third resolution and the image with first resolution are the same.

According to an arrangement of the present disclosure, there is provided a training device of a neural network for medical image processing, including: a pre-processing part, configured to perform a pre-processing process on an original image to obtain a pre-processed image, an augmenting part, configured to perform a data-augmenting process on the pre-processed image to obtain an augmented image which retains a pathological feature, the augmented image including at least one image with first resolution and at least one image with second resolution, and the second resolution being higher than the first resolution, and a training part, configured to train the neural network by inputting the image with first resolution and a part-cropping image from the image with second resolution into the neural network as training samples.

In an arrangement of the present disclosure, the augmenting part includes a first augmenting part and a second augmenting part, the first augmenting part is configured to perform at least one of the following processes to augment the pre-processed image: cropping process, rotating process, upside-down inverting process and horizontal inverting process, and the second augmenting part is configured to perform an image-warping process on the pre-processed image.

In an arrangement of the present disclosure, the augmenting part is configured to perform the data-augmenting process on the pre-processed image to obtain the augmented image which retains the pathological feature, the augmented image includes the at least one image with first resolution and the at least one image with second resolution, and at least one image with third resolution, and the second resolution and the third resolution are higher than the first resolution, and the training part is configured to train the neural network by inputting the image with first resolution and the part-cropping image from the image with second resolution and a part-cropping image from the image with third resolution into the neural network as training samples.

In an arrangement of the present disclosure, resolutions of the part-cropping image from the image with second resolution, the part-cropping image from the image with third resolution and the image with first resolution are the same.

According to an arrangement of the present disclosure, there is provided a training device of a neural network for medical image processing, including: a processor, and a memory having computer program instructions stored thereon that, when executed by the processor, causes the processor to perform one or more blocks in the above training method.

According to an arrangement of the present disclosure, there is provided a medical image processing method based on a neural network, including: obtaining a medical image, processing the medical image by inputting the medical image into the neural network trained by the above training method, and outputting a processed result.

In an arrangement of the present disclosure, the processing the medical image includes classifying the medical image based on a pathological feature of a lesion area.

According to an arrangement of the present disclosure, there is provided a medical image processing device based on a neural network, including: a processor, and a memory having computer program instructions stored thereon that, when executed by the processor, cause the processor to perform one or more blocks in the above medical image processing method.

In an arrangement of the present disclosure, the computer program instructions when executed by the processor cause the processor to perform the above medical image processing method to classify the medical image based on a pathological feature of a lesion area in the medical image.

According to an arrangement of the present disclosure, there is provided an electronic apparatus for medical image processing based on a neural network, including: an image obtaining part, configured to obtain a medical image, an image processing part, configured to process the medical image based on the neural network trained by the above training method, and an outputting part, configured to output an image processing result.

In an arrangement of the present disclosure, the image processing part is configured to classify the medical image based on a pathological feature of a lesion area in the medical image.

It should be understood that both the foregoing general description and the following detailed description are exemplary and explanatory only and are not restrictive of the present disclosure.

BRIEF DESCRIPTION OF THE DRAWINGS

The accompanying drawings herein are incorporated in and constitute a part of the description, illustrate arrangements consistent with the present disclosure, and together with the description serve to explain the principles of the present disclosure. It will be apparent that the drawings in the following description are merely exemplary arrangements of the present disclosure, and other drawings may be obtained based on these accompanying drawings by those skilled in the art without creative effort.

DETAILED DESCRIPTION

Figure 1:
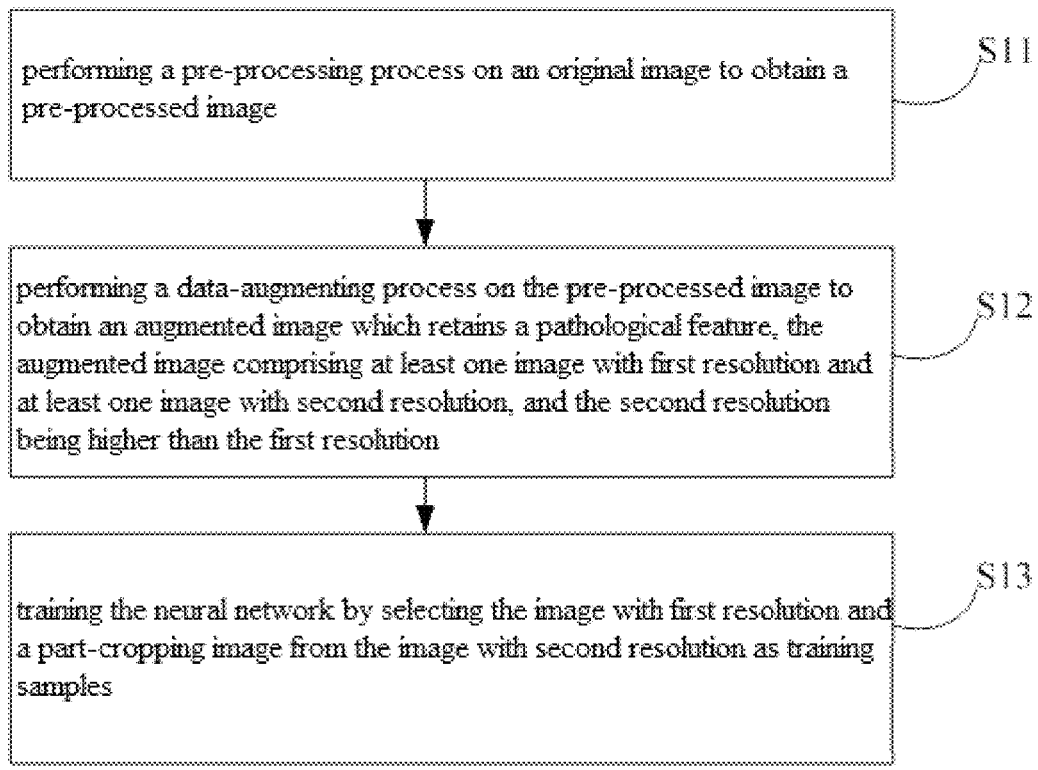
FIG. 1 shows a schematic diagram of a training method of a neural network for medical image processing provided by an arrangement of the present disclosure.

Example arrangements will now be described more fully with reference to the accompanying drawings. However, example arrangements can be implemented in various forms and should not be construed as limited to the examples set forth herein; rather, these arrangements are provided so that this disclosure will be more complete and thorough, and will fully convey the concept of the example arrangements to those skilled in the art. The drawings are merely schematic illustrations of the present disclosure and are not necessarily drawn to scale. The same reference numerals in the drawings denote the same or similar parts, and their repeated description will be omitted.

Furthermore, the described features, structures, or characteristics may be combined in any suitable manner in one or more arrangements. In the following description, numerous specific details are provided for a thorough understanding of the arrangements of the present disclosure. However, those skilled in the art will recognize that the technical solutions of the present disclosure may be practiced while omitting one or more of the specific details, or that other methods, components, devices, steps, etc. may be employed. In other instances, well-known structures, methods, devices, implementations, materials, or operations are not shown or described in detail to avoid obscuring arrangements of the present disclosure.

Some of the block diagrams shown in the figures are functional entities and do not necessarily have to correspond to physically or logically independent entities. These functional entities may be implemented in software, or implemented in one or more hardware modules or integrated circuits, or implemented in different network and/or processor devices and/or microcontroller devices.

In recent years, a neural network, such as a convolutional neural network (CNN), has shown good application in many aspects such as target recognition, target detection, target classification in processing images, and thus are widely applied in various image processing. Since a convolutional neural network such as a convolutional neural network with multiple convolutional layers may detect different regions and dimension features in an image with different convolutional layers, a deep learning method based on the convolutional neural network can classify and recognize the image.

The performance of the convolutional neural network is related to the quantity and quality of the training sample data used in the training.

Convolutional neural networks of various structures have been developed in the art. A conventional neural network is generally consisted of an input layer, a convolutional layer, a pooling layer, and a fully connected layer, namely INPUT (input layer)-CONV (convolutional layer)-POOL (pooling layer)-FC (fully connected layer). The convolutional layer extracts features. The pooling layer compresses the input feature map for dimension reduction. The fully connected layer is used to connect all features and outputs the same.

The convolutional neural network can perform a variety of image processing functions, such as classifying the image, segmenting a target region in the image, identifying an object in the image, and the like. Due to different image processing functions to be performed, different devices are coupled to the output layer of the convolutional neural network. For example, when classifying the image, the output layer of the convolutional neural network is coupled to a classifier.

As described above, the applicant describes the basic concept of the neural network application in the field of image processing by taking the convolutional neural network as an example, which is merely illustrative. In the field of machine learning, there are various structures of neural networks that may be applied in the image processing. As for the convolutional neural network, it may include fully convolutional neural networks FCN, segmentation networks SegNet, dilated convolutions, deep neural networks DeepLab (V1 & V2) based on atrous convolution, deep neural networks DeepLab (V3) based on multi-scale convolution, multi-channel segmentation neural networks RefineNet and the like in addition to the conventional convolutional neural networks listed above.

In an arrangement of the present disclosure, the medical image described may be, for example, an ultrasound image, an X-ray computed tomography (CT) image, a magnetic resonance imaging (MRI) image, a digital subtraction angiography (DSA) image, a positron emission computed tomography (PET) image, a dermoscopy imaging image, and the like according to the device for acquiring the same. According to the content of the medical image, the medical image may include a brain tissue nuclear magnetic resonance image, a spinal cord magnetic resonance image, an eye fundus image, a vascular image, a pancreatic CT image and a lung CT image, a dermoscopy image, and the like.

In an arrangement of the present disclosure, the medical image may be acquired by an image acquisition device, which may include, for example, an ultrasound device, an X-ray device, a nuclear magnetic resonance device, a nuclear medicine device, a medical optical device, a thermal imaging device, and a dermoscopy and the like.

An arrangement of the present disclosure provides a training method of a neural network for medical image processing, and FIG. 1 shows a schematic diagram of a training method of a neural network for medical image processing provided by an exemplary arrangement of the present disclosure.

As shown in FIG. 1, in S11, a pre-processing process is performed on an acquired original image to obtain a pre-processed image.

As shown in FIG. 1, in S12, a data-augmenting process is performed on the pre-processed image to obtain an augmented image which retains a pathological feature.

The augmented image includes at least one image with first resolution and at least one image with second resolution, and the second resolution is higher than the first resolution.

As shown in FIG. 1, in S13, the neural network is trained by selecting the image with first resolution and a part-cropping image from the image with second resolution from the augmented image as training samples.

The so-called part-cropping image may be a region that is selected by a professional according to the characteristic suitable for identifying the pathology in the medical image, for example, a center region, an edge region and the like of the medical image may be selected. The shape of the part-cropping image used may be selected as desired, for example, it may be a rectangle, an ellipse, a triangle, a circle, or the like.

Hereinafter, it is described as an example that the method is applied in the dermoscopy image processing field, that is, the acquired original image is a dermoscopy image. Therefore, in S11, it is needed to pre-process the dermoscopy image according to characteristics of the skin disease.

In some arrangements, the pre-processing process may include a pixel normalizing process and a color constancy process. In the pixel normalization process, an invariant moment of the image is used to find a set of parameters so that it can eliminate the influence of other transformation functions on the image transformation. The pixel normalizing process may reduce the interference on the medical image caused by uneven light. The pixel normalizing process normalizes pixels of three channels (RGB) of the image respectively, and the equations are as follows.

$$r\_new=(r-r\_min)*255.0/(r\_max-r\_min)$$

$$g\_new=(g-g\_min)*255.0/(r\_max-r\_min)$$

$$b\_new=(b-b\_min)*255.0/(r\_max-r\_min)$$

In the above equations, "r", "g" and "b" refer to data (grayscale) of the RGB pixels before the normalizing process respectively, "r_new", "g_new" and "b_new" refer to data of the RGB pixels after the normalizing process respectively, "r_max", "g_max" and "b_max" refer to maximum values of the RGB pixels respectively, and "r_min", "g_min" and "b_min" refer to minimum values of the RGB pixels respectively.

In addition, due to the factors of photographing equipment and environment, the dermoscopy images will have different brightness and color. The differences in skin coloring may affect the performance of the neural network. If it is used as an important feature for skin disease detection, it will cause an error in the classification result. Therefore, a color constancy algorithm is used to process the image. By using the color constancy algorithm, a color image having color deviation acquired under non-standard illumination is restored to a color image having no color deviation acquired under standard illumination, so that the color image having color deviation is corrected automatically.

Figure 2:
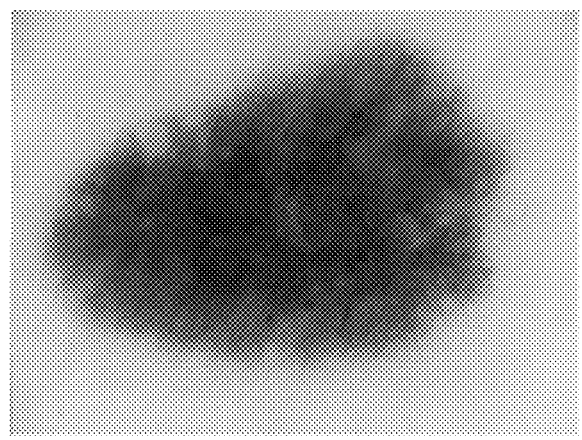
FIG. 2 shows a dermoscopy image before a color constancy process according to an arrangement of the present disclosure.
Figure 3:
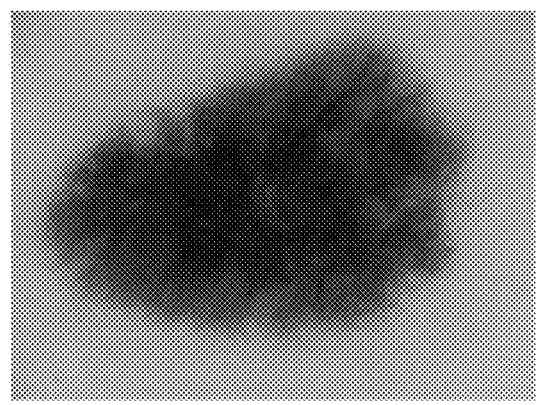
FIG. 3 shows a dermoscopy image after a color constancy process according to an arrangement of the present disclosure.

In some arrangements, firstly, the pixel normalizing process is performed on the original image, and then the color constancy process is performed on the image to obtain a pro-processed image. For example, FIG. 2 shows a dermoscopy image 200 before the color constancy process in the arrangement, and FIG. 3 shows a dermoscopy image 300 after the color constancy process in the arrangement. The light influence caused in photographing is reduced in FIG. 3 in comparison to that in FIG. 2.

In some arrangements, the performing a data-augmenting process on the pre-processed image in S12 includes at least one of the following general augmenting operations to augment the pre-processed image: cropping process, rotating process, upside-down inverting process, horizontal inverting process and the like.

The rotating refers to that the image is randomly rotated 180 degree or less in a left-right direction. The upside-down inverting refers to that the image is inverted up and down with respect to a horizontal direction as symmetry (for example, each of the inverting up and inverting down has a probability of 0.5). The horizontal inverting refers to that the image is inverted horizontally with respect to a vertical direction as symmetry (for example, each of the left inverting and right inverting has a probability of 0.5).

When the medical image is the dermoscopy image, the detection of skin disease needs to pay attention to the boundary information of the lesion area, that is, both of the boundary of the skin disease and the image resolution may affect the diagnosis of the disease, therefore it is necessary to fully retain the boundary information of the lesion area during the random cropping to ensure the accuracy of the image processing result.

In some arrangements of the present disclosure, the "fully retain" in the above-described random cropping process refers to that for the dermoscopy image, most of the lesion area in the image (for example, not less than 60% of the area) is not cropped out.

For example, a 299*299 image is randomly cropped in a 310*310 image, instead of that a 200*200 image is randomly cropped in a 600*600 image.

In some arrangements, the performing a data-augmenting process on the pre-processed image may include performing an image warping process such as Forward Warping, Backward Warping and the like.

When the medical image is the dermoscopy image, the image-warping process is performed to maintain a symmetrical characteristic of the lesion area according to a pathological characteristic of skin disease. The symmetrical characteristic includes symmetry and/or asymmetry. For example, according to the ABCDE principle of skin disease melanoma detection: A (Asymmetry), B (Border), C (Color), D (Diameter) and E (Elevation), the symmetry (or asymmetry) of the lesion area may affect the detection of lesions, and it shows mainly as asymmetry in the left and right halves of nevus or asymmetry in the upper and lower halves of the nevus. Therefore, when performing the image-warping on the dermoscopy image, the symmetry or asymmetry is not changed during image processing, so that the pathological characteristics are not changed.

It should be noted that, for the dermoscopy image, the image-warping augmentation is performed to retain the symmetrical characteristic; and for other pathology images, the image-warping augmentation is performed to keep the pathological characteristic unchanged.

Although the above augmenting processes are described, the arrangement of the present disclosure may include other augmenting processes such as gamma correction, image enhancement, noise-reduction filtering and the like.

After the medical image (for example, the dermascope image) is processed through the pre-processing and augmenting processes, a multi-scale neural network such as convolutional neural network may be established through training by using the acquired images as training samples.

Specifically, the neural network such as convolutional neural network is trained by selecting one image with first resolution and a center-cropping image from the at least one image with second resolution from the augmented image as training samples.

For example, when the medical image is the dermoscopy image, one image with first resolution and a center-cropping image from the at least one image with second resolution are selected from the augmented images as training samples to train the neural network (such as convolutional neural network). In such a way, in one arrangement, the detection of skin diseases needs to pay attention to the information on the edge of the lesion area, and in another arrangement, the pathological feature with high resolution is also helpful for judgment and interpretation of the lesion of the skin disease, therefore, a multi-scale input is constructed for the structure of the neural network in this arrangement.

For example, the image with first resolution is an image with resolution P, and the center-cropping image from the image with second resolution is an image cropped from the center of the image with second resolution which has a resolution Q. The value of Q is greater than P. The resolution of the center-cropping image from the image with second resolution is equal to that of the image with first resolution.

Taking Inception_v3 neural network as an example, the input is 299*299. The augmented image is processed firstly to obtain two images with resolutions of 600*600 and 299*299 respectively. The image with resolution of 299*299 is taken as the image with first resolution, and then a 299*299 image is cropped from the center of the image with second resolution as the center-cropping image from the image with second resolution. Both of the two images with resolution of 299*299 are input into the neural network at the same time.

In the above arrangement, it is illustrated as an example that one image with first resolution and a center-cropping image from one image with second resolution are input into the neural network and the Inception v3 network structure is used. However, in other arrangements of the present disclosure, other neural network structures may be used and the number of input terminals may be greater than two.

In some arrangements, the augmented image includes at least one image with third resolution, and the training method further includes training the neural network by selecting the image with first resolution, the part-cropping image from the image with second resolution and a part-cropping image from the image with third resolution as the training samples.

For example, the resolutions of the part-cropping image from the image with second resolution, the part-cropping image from the image with third resolution and the image with first resolution are the same.

As for the case that the number of input terminals is greater than two, the Gaussian pyramid may be used to extract image features of different scales efficiently. For example, firstly, the size of the original image is doubled to obtain a first layer of a first group in the Gaussian pyramid; the first layer of the first group is processed through Gaussian convolution (Gaussian smoothing or Gaussian filtering) to obtain a second layer of the first group in the pyramid which includes smooth factor $\sigma$; a new smoothing factor is obtained by multiplying the smoothing factor by a scale factor k, and is used to the second layer of the first group in the Gaussian pyramid to obtain a third layer of the first group in the Gaussian pyramid; the above is repeated, and finally, an Lth layer image is obtained. In the same group, different layers have the same image sizes and different smoothing factor, and their corresponding smoothing factors are: $0, \sigma, k\sigma, k^2\sigma, k^3\sigma \ldots k^{(L-2)}\sigma$. The image of the antepenultimate layer in the first group is down-sampled with a scale factor 2 to obtain an image of the first layer of the second group; and then the Gaussian smoothing with a smooth factor $\sigma$ is performed on the image of the first layer of the second group to obtain a second layer of the second group. Like the above blocks, L layers of images may be obtained in the second group. In the same group, different layers have the same image sizes, and their corresponding smoothing factors are: 0, σ, kσ, k²σ, k³σ ... k^(L-2)σ. However, the image size in the second group is half of that in the first group. Therefore, O*L images, which constitute a Gaussian pyramid, may be obtained, wherein there are O groups and each group has L layers.

In the above arrangement, it shows an example in which the image input into the neural network is a square image with equal length and width, however in other arrangements, it may also be a rectangular image with different width and length.

Figure 4:
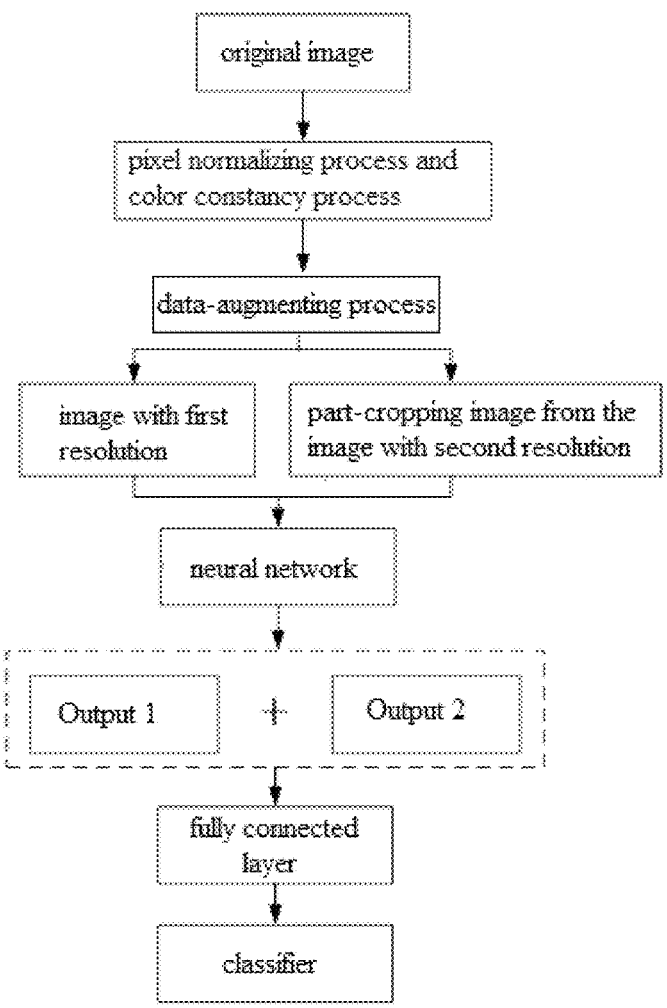
FIG. 4 shows a schematic diagram of a process for processing an original image according to an arrangement of the present disclosure.

Based on the above method, FIG. 4 shows a schematic diagram of a process for processing an original image in the present arrangement. As shown in FIG. 4, a pixel normalizing process and a color constancy process 404 are performed on the original image 402 obtained, and then a data-augmenting process 406 is performed. An image with first resolution 408 and a part-cropping image from an image with second resolution 410 are selected at least and input into the neural network 412 for training. The obtained results (that is, Output 1 414 and Output 2 416) are input into a fully connected layer 418 for integrating together. Then an image tag is predicted by a classifier 420 connected to the last layer (that is, the fully connected layer) in the neural network.

Softmax classifier is used as an example for description. In a Softmax regression, a multi-classification problem is solved, and a class label y can take k (instead of 2) different values. Therefore, for a training set $\{(x^{(1)},y^{(1)}) \ldots (x^{(m)},y^{(m)})\}$ $\{(x^{(1)},y^{(1)}) \ldots (x^{(m)},y^{(m)})\}$, there is $y^{(i)} \in \{1, 2, \ldots k\}$. For a given test input x, if a probability value p(y=j|x) is estimated for each class j by using a hypothesis function, a probability of occurrence of each classification result of x is estimated. Therefore, the hypothesis function will output a k-dimensional vector (the sum of the vector elements is 1) to represent the k estimated probability values. Specifically, the hypothesis function $h_\theta(x)$ is as follows:

$$h_\theta(x^{(i)}) = \begin{bmatrix} p(y^{(i)} = 1 | x^{(i)}; \theta) \\ p(y^{(i)} = 2 | x^{(i)}; \theta) \\ \ldots \\ p(y^{(i)} = k | x^{(i)}; \theta) \end{bmatrix} = \frac{1}{\sum_{j=1}^{k} e^{\theta_j^T x^{(i)}}} \begin{bmatrix} e^{\theta_1^T x^{(i)}} \\ e^{\theta_2^T x^{(i)}} \\ \ldots \\ e^{\theta_k^T x^{(i)}} \end{bmatrix} \quad \text{Equation (1)}$$

Herein, the symbols θ is used to represent all the model parameters. When implementing Softmax regression, θ is represented by a matrix of k*(n+1) for convenience, and the matrix is obtained by listing $\theta_1, \theta_2, \ldots \theta_k$ in a row, which is shown as follows:

$$\theta = \begin{bmatrix} \theta_1^T \\ \theta_2^T \\ \ldots \\ \theta_k^T \end{bmatrix} \quad \text{Equation (2)}$$

Equation (2) is used for calculating to obtain a probability belonging to j as follows:

$$p(y = y^{(i)} | x^{(i)}; \theta) = \frac{e^{\theta_j^T x^{(i)}}}{\sum_{i=1}^{k} e^{\theta_i^T x^{(i)}}} \quad \text{Equation (3)}$$

The classifier has the highest recognition rate when all the conditional probabilities $p(y=y^{(i)}|x^{(i)};\theta)$ of the classes in each sample are the largest, which is equivalent to maximizing the likelihood function as follows:

$$L(\theta | x) = \prod_{i=1}^{m} p(y = y^{(i)} | x^{(i)}; \theta) \quad \text{Equation (4)}$$

In addition, in practical application, the fully connected layer may be implemented by a convolution operation: in the case where the front layer is fully connected, the fully connected layer may be converted into a convolution with 1×1 convolution kernel; and in the case where the front layer is a convolutional layer, the fully connected layer may be converted into a h*w global convolution, where h and w are the height and width of the previous layer convolution result.

It should be noted that in this arrangement, the processing of the dermoscopy image is taken as an example, and the method may also be applied to an image processing in other fields which has a similar demand to that in the dermoscopy image processing.

When the training samples are input into the neural network for training, in order to improve the processing efficiency, the input image may be decomposed into three color channels of R, G, and B for processing respectively, or binarized or converted into grayscale images for processing.

In summary, the pre-processing of the image satisfies the requirement that the neural network requires a large amount of training data. In addition, a data-augmenting process is performed to retain a pathological feature of an image so that the pathological feature is not changed. Therefore, the accuracy of detection of lesion images may be improved when training with the neural network, which may provide assistant diagnosis for doctors.

Figure 5:
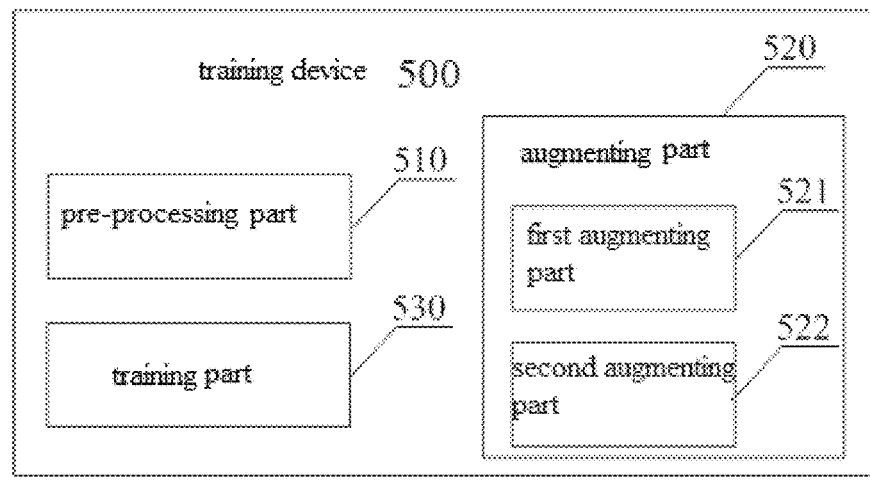
FIG. 5 shows a schematic diagram of a training device of a neural network for medical image processing according to another arrangement of the present disclosure.

As shown in FIG. 5, an arrangement of the present disclosure provides a training device 500 of a neural network for medical image processing. The training device 500 includes a pre-processing part 510, an augmenting part 520 and a training part 530.

The pre-processing part 510 is configured to perform a pre-processing process on an original image to obtain a pre-processed image. The augmenting part 520 is configured to perform a data-augmenting process on the pre-processed image to obtain an augmented image which retains a pathological feature, the augmented image includes at least one image with first resolution and at least one image with second resolution, and the second resolution is higher than the first resolution. The training part 530 is configured to train the neural network by inputting the image with first resolution and a part-cropping image from the image with second resolution into the neural network as training samples.

As shown in FIG. 5, in some arrangements, the augmenting part 520 includes a first augmenting part 521 and a second augmenting part 522, and the first augmenting part 521 is configured to perform at least one of the following processes on the pre-processed image: cropping process, rotating process, upside-down inverting process and horizontal inverting process.

When the medical image includes the dermoscopy image, the cropping process is performed to retain the boundary information of the lesion area.

The second augmenting part 522 is configured to perform an image-warping process on the pre-processed image.

When the medical image is the dermoscopy image, the image-warping augmentation is performed on the dermoscopy image to retain a symmetrical characteristic of the lesion area according to a pathological characteristic of skin disease. The symmetrical characteristic includes symmetry and/or asymmetry.

In some arrangements, the training part 530 includes two input terminals, that is, a first terminal through which the image with first resolution is input into the neural network, and a second input terminal through which a part-cropping image from the image with second resolution is input into the neural network.

For example, the image with first resolution is an image with resolution P, and the image with second resolution is an image with resolution Q (Q>P). The part-cropping image from the image with second resolution is an image cropped from part of the image with second resolution.

For example, the resolution of the part-cropping image from the image with second resolution is equal to that of the image with first resolution.

In some arrangements, the augmenting part 520 is configured to perform the data-augmenting process on the pre-processed image to obtain the augmented image which retains the pathological feature, the augmented image includes the at least one image with first resolution, the at least one image with second resolution, and at least one image with third resolution, and the second resolution and the third resolution are higher than the first resolution. The training part 530 is configured to train the neural network by inputting the image with first resolution, the part-cropping image from the image with second resolution and a part-cropping image from the image with third resolution into the neural network as training samples.

In some arrangements, cropping regions of the part-cropping image from the image with second resolution and the part-cropping image from the image with third resolution are the same, for example, both are center-cropping images.

In some arrangements, the training part includes three input terminals, that is, a first input terminal through which an image with first resolution P is input into the neural network, a second input terminal through which a part-cropping image from an image with resolution A is input into the neural network, and a third input terminal through which a part-cropping image from a image with resolution B is input into the neural network. Each of the resolution A and the resolution B is higher than the first resolution P and the resolution A is different from the resolution B.

In some arrangements, each of the part-cropping image from the image with resolution A input into the neural network through the second input terminal and the part-cropping image from the image with resolution B input into the neural network through the third input terminal has a same resolution as that of the image with first resolution.

For example, for the Inception_v3 neural network, the input is 299*299. The augmented image is processed firstly to obtain three images with resolutions of 600*600, 900*900 and 299*299 respectively. The image with resolution of 299*299 is taken as the image with first resolution, and then 299*299 images are cropped from the centers of the images with resolutions of 600*600 and 900*900 respectively as the center-cropping images from the image with second resolution and the image with third resolution. The three images with resolution of 299*299 are input into the neural network as the training samples of the neural network.

The training device in present arrangement may achieve the same technical effects as the training method described above, and will not be described herein.

An arrangement of the present disclosure further provides a training device of a neural network for medical image processing, including: a processor; and a memory having computer program instructions stored thereon that, when executed by the processor, causes the processor to perform one or more blocks in the method including performing a pre-processing process on an original image to obtain a pre-processed image, performing a data-augmenting process on the pre-processed image to obtain an augmented image which retains a pathological feature, the augmented image including at least one image with first resolution and at least one image with second resolution, and the second resolution being higher than the first resolution, and training the neural network by selecting the image with first resolution and a part-cropping image from the image with second resolution as training samples.

Figure 6:
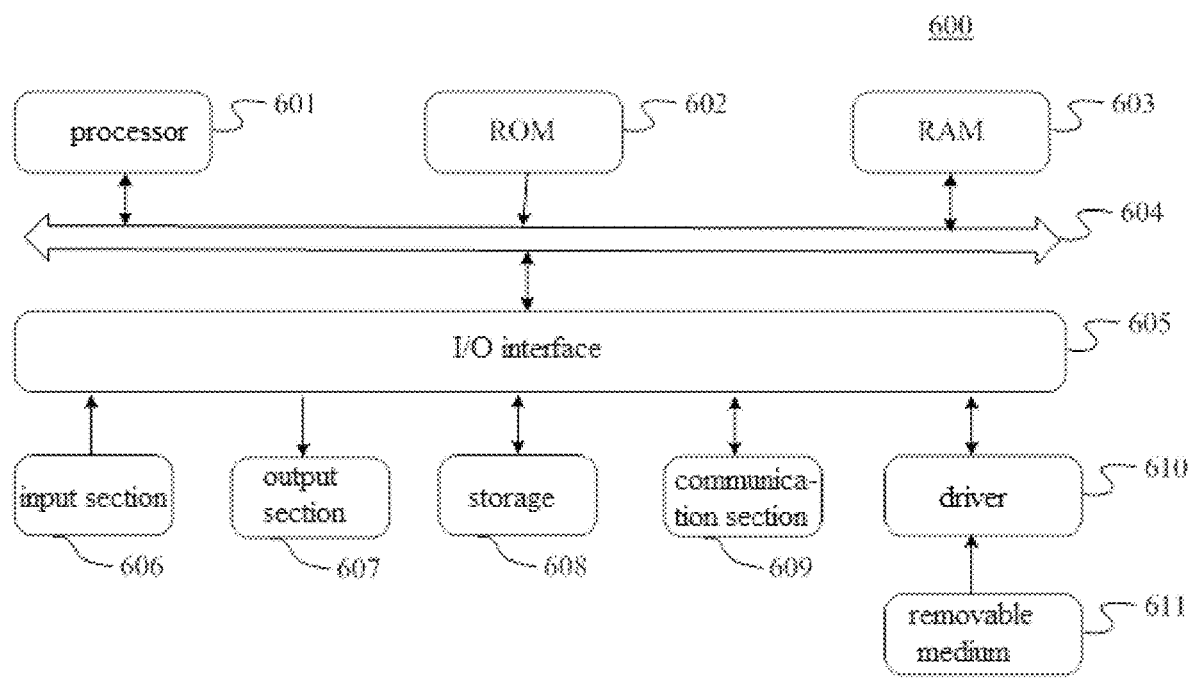
FIG. 6 shows a schematic structure diagram of a computer system of an electronic apparatus according to still another arrangement of the present disclosure.

Now referring to FIG. 6, a schematic structure diagram of a computer system 600 suitable for implementing the training device according to an arrangement of the present disclosure is shown. The electronic apparatus shown in FIG. 6 is merely an example, and should not have any limitation on the function and the scope of use of the arrangements of the present disclosure.

As shown in FIG. 6, the computer system 600 includes one or more processors 601, which may perform various of operations according to program instructions stored in a storage (for example, the program instructions are stored in a read only memory (ROM) 602, or the program instructions are stored in a storage 608 and loaded into a random access memory (RAM) 603). In the storage 608, various programs and data required for the operation of the computer system 600 are also stored. The processor 601, the ROM 602, and the RAM 603 are connected to each another via a bus 604. Input/output (I/O) interface 605 is also connected to the bus 604.

The following components are connected to the I/O interface 605: an input section 606 including a keyboard, a mouse, and the like; an output section 607 including a cathode ray tube (CRT), a liquid crystal display (LCD), a speaker and the like; the storage 608 including a hard disk and the like; and a communication section 609 including a network interface card such as a LAN card, a modem, and the like. The communication section 609 performs communication processing via a network such as the Internet. A driver 610 is also connected to the I/O interface 605 as needed. A removable medium 611 such as a magnetic disk, an optical disk, a magneto-optical disk, a semiconductor memory and the like is mounted on the driver 610 as needed so that the computer program read therefrom can be installed into the storage 608 as needed.

The processor 601 may be a logical operating device capable of processing data and/or executing programs such as a central processing unit (CPU) or a field programmable logic array (FPGA) or a microcontroller (MCU) or a digital signal processor (DSP) or an application specific integrated circuit (ASIC) or the like.

The bus 604 may be a Front Side Bus (FSB), a QuickPath Interconnect (QPI), a direct media interface (DMI), a Peripheral Component Interconnect (PCI), a Peripheral Component Interconnect Express (PCI-E), a HyperTransport (HT), or the like.

According to an arrangement of the present disclosure, the process described above with reference to the flowchart may be implemented as a computer software program. For example, an arrangement of the present disclosure include a computer program product including computer programs embodied on a computer-readable medium, the computer programs include program codes for performing the method illustrated in the flowchart. In such arrangement, the computer programs may be downloaded and installed from the network via the communication section 609, and/or installed from the removable medium 611. When the computer program is executed by the processor 601, the above-described functions defined in the system of the present disclosure are performed.

It should be noted that the computer-readable medium shown in present disclosure may be a computer-readable signal medium or a computer-readable medium or any combination thereof. The computer-readable medium may be for example but not limited to, an electronic, magnetic, optical, electromagnetic, infrared, or semiconductor system, apparatus, or device, or any combination thereof. More specific examples of the computer-readable medium may include but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable medium may be any tangible medium that contains or stores a program that can be used by or in conjunction with an instruction execution system, apparatus, or device. In the present disclosure, the computer-readable signal medium may include a data signal that propagates in baseband or as part of a carrier wave carrying computer-readable program code. Such propagated data signal may take a variety of forms, including but not limited to electromagnetic signals, optical signals, or any suitable combination thereof. The computer-readable signal medium may also be any computer-readable medium other than a computer-readable medium that can transmit, propagate, or transport a program for use by or in connection with an instruction execution system, apparatus, or device. Program codes embodied on a computer readable medium may be transmitted using any suitable medium, including but not limited to wireless, wireline, optical cable, RF, etc., or any suitable combination thereof.

The flowcharts and block diagrams in the figures illustrate the architecture, functionality, and operation of possible implementations of systems, methods, and computer program products according to various arrangements of the present disclosure. In this regard, each block in the flowcharts or block diagrams may represent a part of a module, a program segment, or a code, which includes one or more executable instructions for implementing specified logic functions. It should also be noted that in some implementations as an alternative, the functions noted in the blocks may also occur in different orders than those noted in the figures. For example, two consecutively represented blocks may actually be executed substantially in parallel, and they may sometimes be executed in a reverse order, depending on the function involved. It is also to be noted that each block in the block diagram or the flowchart, and a combination of blocks in the block diagram and the flowchart, may be implemented by a dedicated hardware-based system that performs specified functions or operations, or by a combination of a dedicated hardware and computer instructions.

The component described in the arrangement of the present disclosure may be implemented through software, and may also be implemented through hardware. The described component may also be arranged in a processor, for example, which may be described as: a processor includes a sending unit, an obtaining unit, a determining unit and a first processing unit. The name of the unit does not constitute a limitation on the unit itself in some cases. For example, the sending unit may also be described as "a unit that sends a picture acquisition request to a connected server".

An arrangement of the present disclosure also provides a computer-readable medium, which may be included in the device described in the above arrangements, or may exist separately and not be incorporated into the device. The above computer readable medium carries one or more programs. When one or more of the above programs are executed by one of the devices, one or more steps of the following method may be implemented: performing a pre-processing process on an original image to obtain a pre-processed image; performing a data-augmenting process on the pre-processed image to obtain an augmented image which retains a pathological feature, the augmented image including at least one image with first resolution and at least one image with second resolution, and the second resolution being higher than the first resolution; and training the neural network by selecting the image with first resolution and a part-cropping image from the image with second resolution as training samples.

The training method, training device, and the like provided according to the arrangements of the present disclosure may be trained to form a neural network that satisfies the selected function, which may be used for processing the medical images.

The selected function refers to the function that the neural network is trained to perform. For example, the neural network can be used to perform a classification function, may be used to perform an image segmentation function, may be used to perform a target recognition function in images, and the like. Based on these specific function requirements, a neural network with desired structure and desired parameters such as activation function, loss function and the like may be selected.

According to the neural network trained by the training method, training device and the like provided by the arrangements of the present disclosure, an arrangement of the present disclosure further provides a medical image processing method based on a neural network, including: obtaining a medical image; processing the medical image by inputting the medical image into the neural network trained by the training method or the training device; and outputting a processed result.

In some arrangements, the processing the medical image includes classifying the medical image based on a pathological feature of a lesion area.

In order to meet the functional requirements of the classification, the neural network is connected with a classifier such as an LR classifier, a SoftMax classifier, an SVM classifier and the like, at the output layer.

According to the neural network trained by the training method, training device and the like provided by the arrangements of the present disclosure, an arrangement of the present disclosure further provides a medical image processing device based on a neural network, including: a processor; and a memory having computer program instructions stored thereon that, when executed by the processor, cause the processor to perform one or more steps in the medical image processing method.

For example, the computer program instructions when executed by the processor cause the processor to perform the medical image processing method to classify the medical image based on a pathological feature of a lesion area in the medical image.

For example, the medical image includes a dermoscopy image.

For example, a computer system for implementing the medical image processing device of the arrangement of the present disclosure may be referred to FIG. 6.

Figure 7:
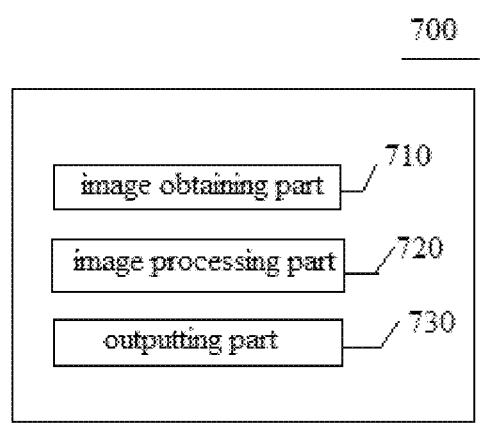
FIG. 7 shows a schematic diagram of an electronic apparatus for medical image processing based on a neural network according to an arrangement of the present disclosure.

In addition, referring to FIG. 7, an arrangement of the present disclosure provides an electronic apparatus 700 for medical image processing based on a neural network, including: an image obtaining part 710, configured to obtain a medical image; an image processing part 720, configured to process the medical image based on the neural network trained by the training method; and an outputting part 730, configured to output an image processing result.

For example, the image processing part 720 is configured to classify the medical image based on a pathological feature of a lesion area in the medical image.

For example, the image obtaining part 710 may include any one of the above described medical imaging devices.

It should be clearly understood that the present disclosure describes how to form and use specific examples, but the principles of the present disclosure are not limited to any details of these examples. Rather, based on the teachings of this disclosure, these principles can be applied to many other arrangements.

The exemplary arrangements of the present disclosure have been specifically illustrated and described above. It should be understood that the disclosure is not to be limited to the details of construction, arrangement, or implementation set forth herein; rather, the disclosure is intended to cover various modifications and equivalent arrangements included within the spirit and scope of the appended claims.

What is claimed is:

1. A training method of a neural network for medical image processing, comprising:
   performing a pre-processing process on an original image to obtain a pre-processed image;
   performing a data-augmenting process on the pre-processed image to obtain an augmented image which retains a pathological feature, the augmented image comprising at least one image with a first resolution, at least one image with a second resolution and at least one image with a third resolution, and the second resolution and the third resolution being higher than the first resolution and being not equal to each other; and
   training the neural network by inputting the at least one image with the first resolution, a center-cropping image from the at least one image with the second resolution and a center-cropping image from the at least one image with the third resolution respectively into three different input terminals of a single neural network as training samples at the same time,
   wherein resolutions of the center-cropping image from the at least one image with the second resolution, the center-cropping image from the at least one image with the third resolution and the at least one image with the first resolution are the same
   wherein the at least one image with the first resolution, the center-cropping image from the at least one image with the second resolution and the center-cropping image from the at least one image with the third resolution are derived from the same original image.

2. The training method according to claim 1, wherein the performing the pre-processing process on the original image comprises performing a pixel normalizing process and a color constancy process on the original image.

3. The training method according to claim 1, wherein the performing the data-augmenting process on the pre-processed image comprises at least one of cropping process, rotating process, upside-down inverting process, and horizontal inverting process.

4. The training method according to claim 3, wherein the performing the data-augmenting process on the pre-processed image further comprises performing an image-warping process on the pre-processed image.

5. The training method according to claim 4, wherein the original image comprises a dermoscopy image, the cropping process is performed on the pre-processed image to retain a boundary of a lesion area, and the image-warping process is performed on the pre-processed image to retain a symmetrical characteristic of the lesion area.

6. A training device of a neural network for medical image processing, comprising:
   at least one hardware processor; and
   a memory having computer program instructions stored thereon that, when executed by the at least one hardware processor, direct the at least one hardware processor to:
      perform a pre-processing process on an original image to obtain a pre- processed image;
      perform a data-augmenting process on the pre-processed image to obtain an augmented image which retains a pathological feature, the augmented image comprising at least one image with a first resolution, at least one image with a second resolution and at least one image with a third resolution, and the second resolution and the third resolution being higher than the first resolution and being not equal to each other; and
      train the neural network by inputting the at least one image with the first resolution, a center-cropping image from the at least one image with the second resolution and a center-cropping image from the at least one image with the third resolution respectively into three different input terminals of a single neural network as training samples at the same time,
      wherein resolutions of the center-cropping image from the at least one image with the second resolution, the center-cropping image from the at least one image with the third resolution and the at least one image with the first resolution are the same,
      wherein the at least one image with the first resolution, the center-cropping image from the at least one image with the second resolution and the center-cropping image from the at least one image with the third resolution are derived from the same original image.

7. A medical image processing method based on a neural network, comprising:
   obtaining a medical image;
   processing the medical image by inputting the medical image into the neural network trained by:
      performing a pre-processing process on the medical image to obtain a pre-processed image;

performing a data-augmenting process on the pre-processed image to obtain an augmented image which retains a pathological feature, the augmented image comprising at least one image with a first resolution, at least one image with a second resolution and at least one image with a third resolution, and the second resolution and the third resolution being higher than the first resolution and being not equal to each other; and training the neural network by inputting the image with first resolution, a center-cropping image from the image with second resolution and a center-cropping image from the at least one image with the third resolution respectively into three different input terminals of a single neural network as training samples at the same time; and outputting a processed result, wherein resolutions of the center-cropping image from the at least one image with the second resolution, the center-cropping image from the at least one image with the third resolution and the at least one image with the first resolution are the same, wherein the at least one image with the first resolution, the center-cropping image from the at least one image with the second resolution and the center-cropping image from the at least one image with the third resolution are derived from the same original image.

8. The medical image processing method according to claim 7, wherein the processing the medical image comprises classifying the medical image based on a pathological feature of a lesion area.

9. A medical image processing device based on a neural network, comprising:

at least one hardware processor; and a memory having computer program instructions stored thereon that, when executed by he at least one hardware processor, direct the at least one hardware processor to:

obtain a medical image;

process the medical image by inputting the medical image into the neural network trained by:

performing a pre-processing process on the medical image to obtain a pre- processed image;

performing a data-augmenting process on the pre-processed image to obtain an augmented image which retains a pathological feature, the augmented image comprising at least one image with first resolution, at least one image with second resolution and at least one image with a third resolution, and the second resolution and the third resolution being higher than the first resolution and being not equal to each other; and training the neural network by inputting the image with first resolution, a center-cropping image from the image with second resolution and a center-cropping image from the at least one image with the third resolution respectively into three different input terminals of a single neural network as training samples at the same time; and output a processed result, wherein resolutions of the center-cropping image from the at least one image with the second resolution, the center-cropping image from the at least one image with the third resolution and the at least one image with the first resolution are the same, wherein the at least one image with the first resolution, the center-cropping image from the at least one image with the second resolution and the center-cropping image from the at least one image with the third resolution are derived from the same original image.

10. The medical image processing device according to claim 9, wherein the computer program instructions when executed by the processor cause the processor to classify the medical image based on a pathological feature of a lesion area in the medical image by performing the medical image processing method.

* * * * *